(12) United States Patent
Sheridon et al.

(10) Patent No.: US 6,496,298 B1
(45) Date of Patent: Dec. 17, 2002

(54) BICHROMAL BEADS HAVING CHARGE ADJUVANTS THEREIN

(75) Inventors: Nicholas K. Sheridon, Los Altos, CA (US); Ron Swidler, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/427,411

(22) Filed: Oct. 26, 1999

(51) Int. Cl.$^7$ .......................... G02B 26/00; B32B 15/02
(52) U.S. Cl. .................. 359/296; 428/402.21; 428/407; 523/207; 523/210; 345/107; 345/85
(58) Field of Search .................. 345/107, 85; 428/323, 428/327, 402.21, 407; 264/4.7, 343; 427/213.3, 213.31, 213.34, 213.36; 523/207, 210; 359/296; 349/86

(56) References Cited

U.S. PATENT DOCUMENTS

| 4,126,854 A | 11/1978 | Sheridon | 340/373 |
|---|---|---|---|
| 4,143,103 A | 3/1979 | Sheridon | 264/4 |
| 4,261,653 A | 4/1981 | Goodrich | 350/362 |
| 4,438,160 A | 3/1984 | Ishikawa et al. | 427/214 |
| 4,810,431 A | 3/1989 | Leidner | 264/15 |
| 5,262,098 A | 11/1993 | Crowley et al. | 264/8 |
| 5,389,945 A | 2/1995 | Sheridon | 345/85 |
| 5,460,905 A | 10/1995 | Skotheim | 429/213 |
| 5,462,566 A | 10/1995 | Skotheim | 29/623.1 |
| 5,538,812 A | 7/1996 | Lee et al. | 429/192 |
| 5,601,947 A | 2/1997 | Skotheim et al. | 429/213 |
| 5,648,187 A | 7/1997 | Skotheim | 429/213 |
| 5,690,702 A | 11/1997 | Skotheim et al. | 29/623.1 |
| 5,716,421 A | 2/1998 | Pendalwar et al. | 29/623.2 |
| 5,772,934 A | 6/1998 | MacFadden | 264/42 |
| 5,773,166 A | 6/1998 | Matsui et al. | 429/212 |
| 5,900,858 A | 5/1999 | Richley | 345/107 |
| 5,914,805 A | 6/1999 | Crowley et al. | 359/296 |

FOREIGN PATENT DOCUMENTS

| EP | 0 821 368 A2 | 1/1998 |
|---|---|---|
| EP | 0 881 618 A1 | 12/1998 |
| JP | 63-94501 A | * 4/1988 |
| JP | 63-221188 A | * 9/1988 |
| JP | 3-139552 A | * 6/1991 |
| JP | 3-196407 A | * 8/1991 |
| JP | 3-238704 A | * 10/1991 |
| JP | 7-37419 A | * 2/1995 |
| JP | 8-27344 A | * 1/1996 |
| JP | 8-165395 A | * 6/1996 |
| WO | WO 96/39725 | 12/1996 |
| WO | WO 97/44840 | 11/1997 |
| WO | WO 97/48145 | 12/1997 |

OTHER PUBLICATIONS

"Polymer Electrolytes" by Michael B. Armand, Ann. Rev. Mater. SCi. 1986, pp. 245–261.

* cited by examiner

*Primary Examiner*—Evelyn A. Lester
(74) *Attorney, Agent, or Firm*—Annette L. Bade

(57) ABSTRACT

A display media with an encapsulant medium, and bichromal beads having a charge adjuvant, wherein the bichromal beads are dispersed or contained in the encapsulant medium is set forth.

22 Claims, 1 Drawing Sheet

BICHROMAL BEADS HAVING CHARGE ADJUVANTS THEREIN

CROSS REFERENCE TO RELATED APPLICATIONS

The following U.S. Pat. Nos. 6,335,818 and 6,362,915, are assigned to the same assignee of the present application. The entire disclosures of these patents are totally incorporated herein by reference in their entirety.

BACKGROUND OF THE INVENTION

This invention generally relates to display media, and the preparation of display media, and to devices using such display media. In particular, this invention relates to display media and displays for which the image remains in view after the field and/or power used to form the image is eliminated (completely reduced to zero), or reduced (decreased to a level below normally required to form the image). The image is formed by switching materials in the pixels between two states (such as, for example, black and white). In embodiments, the display media comprise bichromal beads, and in preferred embodiments, Gyricon beads. In embodiments, the bichromal beads comprise charge adjuvants dispersed or contained therein. In embodiments, the charge adjuvants are polymers, and in preferred embodiments, polymers containing a relatively high level of ethylene oxide groups. The display media made with Gyricon beads are useful in generating images which can be stored or erased, and function by rotating a bichromal sphere by an external field to create the image.

Display media, such as Electric Paper or twisted ball panel display devices, are known and are described, for example, in U.S. Pat. Nos. 4,126,854; 4,143,103; 4,261,653; 4,438,160; 5,389,945. The media generally are comprised of an encapsulant medium material, for example, an elastomer, such as a cured polysiloxane, sandwiched between two indium tin oxide coated substrates, such as glass or MYLAR™. Generally, the elastomer layer has closely packed cavities, each containing a bichromal sphere suspended in a dielectric liquid. The dielectric liquid may also be present in substantial amounts in the elastomer matrix. In media that are active in an electric field, the bichromal spheres have a net dipole due to different levels of charge on the two sides of the sphere. An image is formed by the application of an electric field to each pixel of the display, which rotates the bichromal spheres to expose one color or the other to the viewing surface of the media. The spheres may also have a net charge, in which case they will translate in the electric field as well as rotate. When the electric field is reduced or eliminated, the spheres ideally do not rotate further; hence, both colors of the image remain intact. This image bistability is one feature of display media made with bichromal Gyricon beads.

The fabrication of certain bichromal spheres is known, for example, as set forth in the above mentioned U.S. Pat. No. 4,143,103 patent, wherein the sphere is comprised of black polyethylene with a light reflective material, for example, titanium oxide, sputtered on hemisphere. Also in U.S. Pat. No. 4,438,160, a rotary ball is prepared by coating white glass balls of about 50 microns in diameter, with an inorganic coloring layer such as indium by evaporation. In a similar process, there is disclosed in an article entitled "The Gyricon—A twisting Ball Display", published in the proceedings of the S.I.D., Vol. 18/3 and 4 (1977), a method for fabricating bichromal balls by first heavily loading glass balls with a white pigment such as titanium oxide, followed by coating from one direction in a vacuum evaporation chamber with a dense layer of nonconductive black material which coats only one hemisphere.

Also in U.S. Pat. No. 4,810,431 by Leidner, there is disclosed a process for generating spherical particles by (a) coextruding a fiber of a semi-circular layer of a polyethylene pigmented white and a semi-circular black layer of polyethylene containing magnetite, (b) chopping the resultant fiber into fine particles ranging from 10 microns to about 10 millimeters, (c) mixing the particles with clay or anti-agglomeration materials, and (d) heating the mixture with a liquid at about 120° C. to spherodize the particles, followed by cooling to allow for solidification.

Reference is made to U.S. Pat. No. 5,262,098, and in co-pending patent applications U.S. application Ser. No. 09/360,088, filed Jul. 23, 1999, entitled "Method and Apparatus for Fabricating Bichromal Elements", and U.S. application Ser. No. 09/360,052, filed Jul. 23, 1999, entitled "Method and Apparatus for Fabricating Bichromal Elements", now abandoned. These applications disclose apparatuses for fabricating hemispherically bichromal balls comprising a separator member having opposing first and second surfaces and an edge region in contact with both surfaces, and delivery means for flowing first and second colored hardenable liquid material over the first and second surfaces, respectively, so that the liquid materials arrive at the edge, usually at substantially the same flow rate, and form a reservoir outboard of the edge region. The reservoir comprises side-by-side regions of different colors, which in a preferred embodiment, do not intermix. Further means are provided for propelling the first and second liquid materials away from the separator member and out of the reservoir into a fluid medium. As this occurs, a plurality of forward ends of side-by-side bichromal streams become unstable and break up into droplets. The droplets form into spherical balls, each of the balls approximately comprising hemispheres of differently colored hardenable liquids. These bichromal balls are from about 5 to about 200 microns in diameter.

The aforementioned display media can suffer from drawbacks caused by incomplete or lack of rotation of the bichromal beads. When the beads do not rotate close to 180°, the switching from one color to the other is not complete. As a result, image quality suffers. In some cases, increasing the strength of the electric field used to rotate the spheres can help in achieving more complete rotation, but in other cases sufficient rotation cannot be attained, even at higher fields. In the latter cases, it is believed that the dipole strength of the sphere relative to the monopole strength is too small, rendering it difficult to get sufficient rotation before the sphere translates across its cavity in the elastomer matrix. Many of the beads lack sufficient monopole and dipole strengths to dislodge them from the cavity walls. Furthermore, it is usually preferable to produce media requiring an electric field that is not too high in magnitude, since the cost of display products made from media that switch at lower electric fields can be advantaged.

Another drawback of the aforementioned display media can be the lack of a sharp voltage threshold, depending upon the formulation. Consider a media that requires a voltage ±V to get sufficient sphere rotation and hence switching between colors. There is a sharp voltage threshold above a magnitude of ½V when the spheres do not rotate at voltages of magnitudes less than or equal to ½V. During the course of writing an image on a media with a sharp voltage threshold above a magnitude of ½V, pixels that experience voltages between +½V and 0 will not change their color. For certain applications this property is desired. An example application is a display device with passive matrix addressing. In the case of passive matrix addressing, a pixel of the display is addressed by applying half of the required voltage to both the row and column of that pixel, the two half voltages having opposite polarities to yield a total voltage across the pixel equal to the switching voltage of ±V. At the same time, however, other pixels in the same row but in other columns, or in the same column but in other rows, experience a voltage of ±½V. Thus, it is desired that the spheres in those pixels do not rotate at the voltage ±½V. A sharp voltage threshold above ±½V gives the desired behavior, whereas a media that lacks a sharp voltage threshold does not. Since the display media described in the above paragraphs may not have a sharp voltage threshold at or above ±½V when made using bichromal spheres according to some of the examples and formulations disclosed in the prior art, passive matrix addressing on such media results in poor image quality due to rotation of spheres at voltages in the range of −½V to +½V.

Materials that can improve the rotational behavior of bichromal beads could enable display media to be used in a wider variety of applications than is currently possible. For example, materials that provide a more reproducible and lower voltage for rotation and a sharper voltage threshold above one-half of the voltage used for rotation, could be used to make bichromal passive matrix displays a reality. Therefore, it is desired to provide a display media wherein a threshold voltage exists that is larger than one-half of the voltage used for rotation. It is further desired to provide a display media wherein the threshold voltage is sharper to eliminate most, or ideally all, of the rotation below the threshold voltage and more complete rotation can be obtained at a lower applied voltage. It is still further desired to provide a display media in which the beads have sufficient monopole and dipole strengths to allow the electric field to pull them from the cavity walls.

The present invention provides, in embodiments, for bichromal sphere formulations that include charge adjuvants in order to help achieve lower switching voltages, faster and more complete rotation of beads, a large percentage of the beads removable from the stiction of the cavity walls, and more distinct voltage thresholds for displays and display media containing bichromal beads, and in particular, Gyricon beads. The bichromal bead formulation herein provides stronger monopole and dipole strengths.

SUMMARY OF THE INVENTION

Embodiments of the present invention include: a display media comprising a) an encapsulant medium, and b) bichromal beads comprising a charge adjuvant, wherein the bichromal beads are dispersed in the encapsulant medium.

Embodiments also include: a display media comprising a) an encapsulant medium, and b) bichromal beads comprising a polymer, wherein the polymer has at least 4 alkylene oxide units per polymer molecule, and wherein the bichromal beads are dispersed in the encapsulant medium.

Embodiments further include: a display apparatus capable of causing an image to be displayed on a display media comprising a) an encapsulant medium, and b) bichromal beads comprising a charge adjuvant, wherein the bichromal beads are dispersed in the encapsulant medium; and a means for orienting the bichromal beads in the encapsulant medium so as to form an image on the display media.

DETAILED DESCRIPTION OF THE INVENTION

The present invention relates to twisting ball display media containing bichromal beads or balls. The display media comprises a media that, in embodiments, has many attributes of a paper document. For example, in embodiments, the media may look like paper, have ambient light behavior like paper, be flexible like paper, be carried around like paper, be copied like paper, and have nearly the archival memory of paper.

Figure 1:
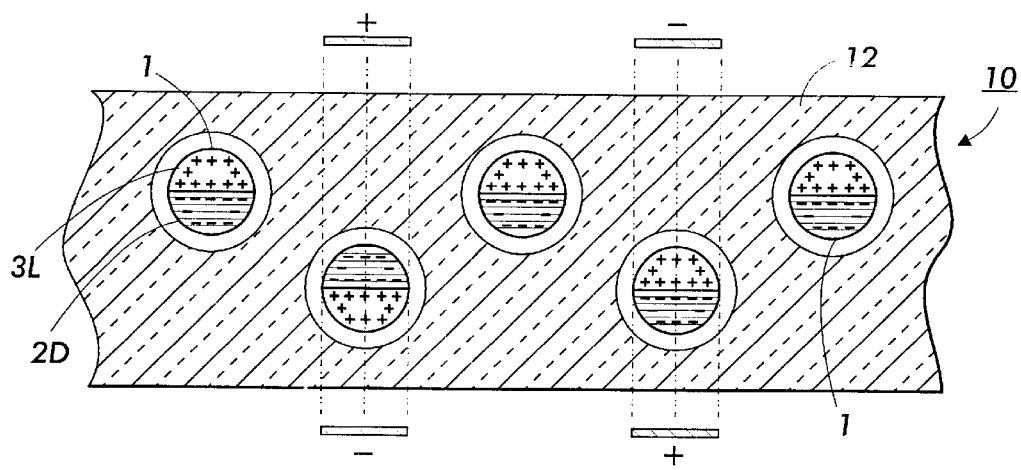
FIG. 1 is a cross sectional view of a portion of a display media comprising a plurality of bichromal beads which have a darker pigmented hemisphere on one side and a lighter hemisphere on the other side.
Figure 2:
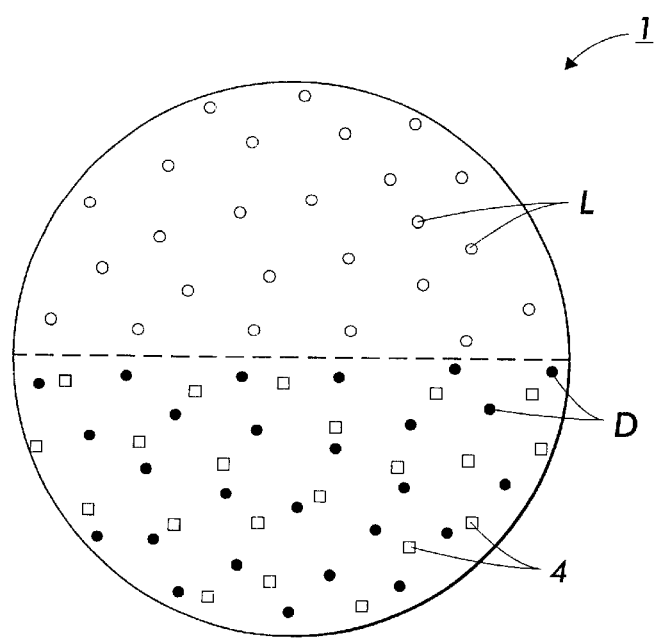
FIG. 2 is an enlarged view of bichromal beads, and depicts lighter pigments dispersed or contained in the hemisphere, and darker pigments in another hemisphere.

Referring to FIG. 1, there is shown a cross sectional view of a portion of a display media 10 comprising a plurality of bichromal beads 1 which have a darker pigmented hemisphere 2D on one side and a lighter hemisphere 3L on the other side. FIG. 2 is an enlarged view of the bichromal beads 1, and depicts lighter pigments L dispersed or contained in hemisphere 3L, and depicts darker pigments D in hemisphere 2D. The display media 12 can be any media capable of displaying an image, such as a sheet, and may comprise any suitable material for housing the bichromal beads such as, for example, an elastomer material.

As shown in FIG. 1, each of the hemispheres 3L and 2D contain electrical charges. The values of these charges are found to be dependent upon both the concentrations of pigments and the presence of the charge adjuvant (where present).

The display media described herein can be used in a display apparatus or device for the purpose of causing an image to be formed on the display media. In general, bichromal spheres are dispersed or contained in an encapsulant medium. In optional embodiments, the beads may be micro encapsulated. In this case, the beads may still be dispersed or contained in a encapsulant medium, but they may also be, e.g., painted or brushed onto surfaces, or the like. The bichromal spheres of the present invention which comprise hemispheres of different colors and different amounts of electrostatic charge are useful as a flexible "electric paper" display media. The present invention is generally directed to a display media, or a rotary twisted ball, electric paper or a Gyricon display media, comprised of bichromal spheres or Gyricon beads. The flexible display media, under the action of an external electric field, allows the bichromal spheres to rotate in accordance with their electrical anisotropy within the encapsulant medium to provide an image.

In preferred embodiments, the bichromal spheres are darker or black on one side and lighter or white on the other side. Preferred bichromal spheres consist of white pigment titanium dioxide dispersed in the base material on one side of the bead, and a black pigment dispersed in the base material on the other side of the bead.

The bichromal spheres are relatively small, for example from about 2 to about 200 microns in diameter, and preferably from about 30 to about 120 microns in diameter.

The bichromal spheres are also preferably fabricated by the processes as disclosed in U.S. Pat. No. 5,262,098, or as disclosed in copending applications U.S. application Ser. No. 09/360,088, tiled Jul. 23, 1999, entitled "Method and Apparatus for Fabricating Bichromal Elements", and U.S. application Ser. No. 09/360,052, filed Jul. 23, 1999, entitled "Method and Apparatus for Fabricating Bichromal Elements", now abandoned. Alternatively, other known methods for the preparation of bichromal spheres can be practiced, such as disclosed in U.S. Pat. No. 4,126,854. The disclosure of each of these references is hereby incorporated by reference in their entirety.

Bichromal beads have both monopole and dipole charge components. The monopole charge is simply the net charge on the bead, expressed as proportional to $Q(1)+Q(2)$, where $Q(1)$ and $Q(2)$ is the total charge on the lighter or white side of the bead and $Q(2)$ is the total charge on the darker or black side of the bead. If $Q(1)$ and $Q(2)$ were equal and opposite polarity charges, the monopole charge would be zero. Typically, they have the same polarity.

The monopole charge is responsible for causing the bead to move from one cavity wall position to the opposite position, upon application of an electric field. Without this charge, the bead would remain locked to the cavity wall and rotation would be very difficult.

The dipole moment causes the bead to rotate as it moves across the oil-filled cavity. The force causing this rotation is proportional to the dipole moment, which itself is proportional to $Q(1)-Q(2)$.

In a well operating display, the application of a suitable electric field will cause the bead to move across the oil filled cavity, rotating as it moves. By the time it reaches the opposite section of the cavity wall, its rotation of 180 degrees must be complete. Over rotation due to the angular momentum of the bead does not occur in this regime of hydrodynamics. This means that strong monopoles and strong dipoles are desirable, as well as the proper balance between them.

The charge adjuvants appear to augment the monopole and dipole charge distributions on the bichromal bead.

The bichromal elements, or spheres or beads, preferably comprise charge adjuvants in one or both hemispheres. The presence of the charge adjuvants improves the bichromal bead behavior in an electric field by contributing to a lower switching voltage, faster rotation, elimination of cavity wall sticking, and/or a more distinct voltage threshold for displays and display media containing the bichromal beads, an example being Gyricon beads.

Examples of charge adjuvants include polymers such as polyalkyls such as polyethylene oxide, polypropylene oxide, polyethylene oxide-polypropylene oxide copolymers, ethoxylated alcohols, amides, amines, acids, phenols and derivatives thereof.

Preferably, the bichromal spheres or beads comprise a polymer having polyether functionality. It is preferred that the alkyl poly(alkylene oxide) have at least 4, and preferably from about 20 to about 100 alkylene oxide units per polymer molecule. Preferably, the polymers having the highest ethylene oxide levels are used.

Preferably, the charge adjuvant is present in the bichromal beads in an amount of from about 0.1 to about 50 weight percent, and preferably from about 1 to about 5 weight percent, based on the total weight of solids, which includes the weight of the wax and pigment or dye. Preferably the pigment or dye is present in an amount of from about 1 to about 70 weight percent.

Commercially available examples of charge adjuvants include those from Baker/Petrolite UNITHOX® such as 5175 (acetate ester, $E_{16.7}EO_{42}$), 5126 (phosphate ester, $E_{16.7}EO_{42}$), 5142 (acrylate ester, $E_{16.7}EO_{42}$), 5208 (phosphate ester, $E_{24}EO_{17}$), 5152 (sulfate ester, $E_{24}, EO_{17}$), 5119 (phosphate ester ($E_{16.7}EO_{42}$), and the like. Note that "EO" percentage refers to the percentage by weight of the molecule comprising ethylene oxide. Such commercially available UNITHOX® polymers (preferably ethoxylates) are preferably present at levels ranging from about 0.1 to about 8 percent, and particularly preferred of from about 0.2 to about 5 percent by total weight of the pigmented dispersion, and preferably the black or dark pigmented dispersion. Other commercially available polymers include POLYOX® N-10 (ethylene oxide and fumed silica). This commercially available polymer ethoxylate is preferably present in an amount of from about 0.1 to about 8 percent, and preferably from about 0.2 to about 3 percent by total weight of the pigmented dispersion. Another commercially available polymer includes UNITHOX® 750, which is preferably present in an amount of from about 0.01 to about 3 percent, preferably from about 0.1 to about 0.5 percent by total weight of the pigmented dispersion. In addition, a preferred commercially available polymer is TWEEN® 61 (polyoxyethylene sorbitan monostearate), which is preferably present in an amount of from about 0.1 to about 5 percent, preferably from about 0.5 to about 1 percent by total weight of the pigmented dispersion. Still other charge adjuvants include ethoxylated amids, fatty acids, fatty alcohols and fatty amines, and commercially available charge adjuvants such as BRIJ® and MYRI® (ICI Americas, Inc.), and ETHOMIDES®, ETHOMINES® and ETHOTAT® (Akzo Nobel Chemicals, Inc.).

It is desirable that charge adjuvants be selected that are not soluble in the dielectric liquid that fills the cavities in which the bichromal balls are contained.

Turning to FIG. 2, a preferred embodiment is demonstrated, wherein polymers 4 are dispersed or contained in the hemisphere 2D containing the darker pigment D.

In embodiments, the beads comprise a polymer or wax as a base material. Examples of suitable polymers include a low melting hydrocarbon, preferably with a melting point of from about 50 to about 180° C., and more specifically from about 80 to about 130° C. Further, it is preferred that the polymer have a carbon content of from about 18 to about 1,000, and more specifically from about 50 to about 200 carbon atoms. A preferred wax is Polywax 1000 from Baker Petrolite Corporation. Examples of suitable waxes include carnauba wax and candelia wax.

In embodiments, a pigment is used. Preferably, the darker pigment in the darker hemisphere 2D is a manganese ferrite or carbon black, although other suitable pigments can be used such as modified carbon blacks, magnetites, ferrites such as manganese ferrite, and color pigments. In an embodiment wherein a black pigment is used, a preferred black pigment is 6331 from Ferro Corporation. In an embodiment wherein an optically lighter or white pigment is used in the lighter hemisphere 3L, a preferred white pigment is DuPont R104 $TiO_2$ pigment.

The bichromal beads are dispersed or contained in an encapsulant media. Preferably, the encapsulant media comprises an elastomer material. Specific examples of preferred elastomer materials include polysiloxanes, such as Sylgard 184. Examples of suitable elastomer materials are included in U.S. Pat. No. 4,126,854, the disclosure of which is incorporated herein in its entirety.

Preferably, the encapsulant medium comprises a liquid material for the purpose of providing liquid-filled cavities for each bichromal bead in which the bead can rotate relatively freely. Without any fluid around the bead, the bead is tightly held in the elastomer and cannot rotate, since there is no gap between the bead and the elastomer. Preferred liquid materials include oils such as Isopar oils or silicone oils, for example, Dow Corning 200 silicone oil, 10 cS or less. Preferably, the encapsulant medium is swelled in the oil. Reference is made to U.S. Pat. No. 4,126,854 which discusses oils and how an elastomer is swelled in oil.

In embodiments, the encapsulant medium comprising the bichromal beads dispersed or contained therein, is sandwiched between two outer substrates which, in total, comprise the display media. The outer substrates are typically glass or plastic sheets that comprise indium tin oxide coatings on their inner surfaces. These coatings may be subdivided to allow application of the desired electric field at each pixel.

All the patents and applications referred to herein are hereby specifically and totally incorporated herein by reference in their entirety in the instant specification.

The following Examples further define and describe embodiments of the present invention. Unless otherwise indicated, all parts and percentages are by weight.

EXAMPLES

Example 1

A black pigmented wax was made by dispersing 20% of F-6331 pigment (Ferro Corp.), 2.3% of X-5175 (Baker-Petrolite UNITHOX®, acetate ester, $E_{16.7}$, $EO_{42}$), into 77.7% of Polywax 1000 (Baker-Petrolite). This wax and a white wax consisting of 20% $TiO_2$ (R104 from DuPont) and 80% Polywax 1000 were used to make bichromal balls. The balls were sieved into fractions, and the 90–106 micron fraction was used to make an elastomer sheet. The sheet was made by mixing 5.00 g of SYLGARD 184 base, 0.75 g SYLGARD 184 curing agent, and 5.75 g of the 90–106 micron balls; placing the mixture under vacuum to de-aerate; casting the mixture into a 0.012 inch sheet; and curing at 90° C. for 2 hours. After curing, small subsheets were cut out and soaked in ISOPAR-L with anhydrous calcium sulfate overnight.

The subsheets were made into displays by mounting between two glass plates coated with indium tin oxide in order to test the soaked subsheets. The surface of the glass plates with the indium tin oxide coating was placed on the inside adjacent to the subsheet. In the final test display, the components from one side to the other are glass, ITO coating, soaked subsheet, ITO coating on glass plate #2, glass plate #2.

The above steps were repeated using the following formulations set forth in Table I below. The above experiment used Formulation 1 below.

TABLE 1

| Formulation | White Side | Black side |
|---|---|---|
| Formulation 1 | 80% Polywax 1000<br>20% DuPont R104<br>(TiO$_2$) | 77.7% Polywax 1000<br>20% Ferro 6331 pigment<br>2.3% 5175 |
| Formulation 2 | 80% Polywax 1000<br>20% DuPont R104<br>(TiO$_2$) | 77.7% Polywax 1000<br>20% Cabot 520 carbon black<br>2.3% 5175 |
| Formulation 3 | 80% Polywax 1000<br>20% DuPont R104<br>(TiO$_2$) | 92.7% Polywax 1000<br>5% Sun Blue/green flush pigment<br>2.3% 5175 |

Formulations 1 and 2 provided excellent bead rotation. When the same formulations were made without the use of the 5175 additive, very poor results were obtained.

Formulation 3, using a pigment other than carbon black, also provided good bichromal bead rotation. The same formulation without the 5175 provided very poor rotation.

The above results demonstrate that the use of charge adjuvants, especially those having significant ethylene oxide groups, provides excellent operation of bichromal beads made from a wide range of pigments.

Other modifications of the present invention may occur to one of ordinary skill in the art subsequent to a review of the present application, and these modifications, including equivalents, or substantial equivalents thereof, are intended to be included within the scope of the present invention.

We claim:

1. A display media comprising a) an encapsulant medium, and b) bichromal beads comprising a charge adjuvant, wherein said bichromal beads are dispersed in said encapsulant medium.

2. A display media in accordance with claim 1, wherein said charge adjuvant comprises a poly(alkylene oxide).

3. A display media in accordance with claim 2, wherein said poly(alkylene oxide) has at least 4 alkylene oxide units per poly(alkylene oxide) molecule.

4. A display media in accordance with claim 3, wherein said poly(alkylene oxide) has from about 20 to about 100 alkylene oxide units per poly(alkylene oxide) molecule.

5. A display media in accordance with claim 2, wherein said poly(alkylene oxide) is an alkyl poly(alkylene oxide).

6. A display media in accordance with claim 2, wherein said poly(alkylene oxide) is selected from the group consisting of poly(alkylene oxide) acetate ester, poly(alkylene oxide) alcohol, poly(alkylene oxide) phosphate ester, poly(alkylene oxide) acrylate ester, poly(alkylene oxide) sulfate ester, poly(alkylene oxide) sorbitan monostearate, ethoxylated amids, fatty acids, fatty alcohols and fatty amines.

7. A display media in accordance with claim 2, wherein said alkylene is selected from the group consisting of methylene, ethylene, propylene and butylene.

8. A display media in accordance with claim 1, wherein said charge adjuvant is present in the bichromal beads in an amount of from about 0.1 to about 50 percent by weight of total solids.

9. A display media in accordance with claim 1, wherein said bichromal beads further comprise a pigment.

10. A display media in accordance with claim 9, wherein said pigment is selected from the group consisting of carbon black and titanium oxide.

11. A display media in accordance with claim 9, wherein said pigment is a manganese ferrite.

12. A display media in accordance with claim 1, wherein said encapsulant medium comprises an elastomer.

13. A display media in accordance with claim 12, wherein said elastomer comprises a polysiloxane.

14. A display media in accordance with claim 12, wherein said elastomer comprises an oil.

15. A display media in accordance with claim 1, wherein said bichromal beads are microencapsulated.

16. A display media comprising a) an encapsulant medium, and b) bichromal beads comprising a polymer, wherein said polymer has at least 4 alkylene oxide units per polymer molecule, and wherein said bichromal beads are dispersed in said encapsulant medium.

17. A display apparatus capable of causing an image to be displayed on a display media comprising:
  i) a) an encapsulant medium, and b) bichromal beads comprising a charge adjuvant, wherein said bichromal beads are dispersed in said encapsulant medium; and
  ii) a means for orienting said bichromal beads in said encapsulant medium so as to form an image on said display media.

18. A display apparatus in accordance with claim 17, wherein said polymer comprises a poly(alkylene oxide).

19. A display apparatus in accordance with claim 18, wherein said poly(alkylene oxide) has at least 4 alkylene oxide units per poly(alkylene oxide) molecule.

20. A display apparatus in accordance with claim 19, wherein said poly(alkylene oxide) has from about 20 to about 100 alkylene oxide units per poly(alkylene oxide) molecule.

21. A display apparatus in accordance with claim 18, wherein said poly(alkylene oxide) is selected from the group consisting of poly(alkylene oxide) acetate ester, poly(alkylene oxide) alcohol, poly(alkylene oxide) phosphate ester, poly(alkylene oxide) acrylate ester, poly(alkylene oxide) sulfate ester, and poly(alkylene oxide) sorbitan monostearate.

22. A display apparatus in accordance with claim 18, wherein said alkylene is selected from the group consisting of methylene, ethylene, propylene and butylene.

* * * * *